United States Patent [19]

Maida

[11] 4,350,422
[45] Sep. 21, 1982

[54] BATTERY CHECKING DEVICE OF A MOTOR DRIVEN CAMERA

[75] Inventor: Osamu Maida, Tokyo, Japan

[73] Assignee: Nippon Kogaku K.K., Tokyo, Japan

[21] Appl. No.: 266,115

[22] Filed: May 21, 1981

[30] Foreign Application Priority Data

May 30, 1980 [JP] Japan ................................. 55-71494

[51] Int. Cl.³ .............................................. G03B 1/18
[52] U.S. Cl. ...................................... 354/173; 354/289
[58] Field of Search ................................ 354/173, 289

[56] References Cited

U.S. PATENT DOCUMENTS

| | | | |
|---|---|---|---|
| 4,167,314 | 9/1979 | Ichiyanagi et al. | 354/173 |
| 4,176,936 | 12/1979 | Kozuki et al. | 354/173 |
| 4,220,407 | 9/1980 | Stemme et al. | 354/289 |
| 4,269,494 | 5/1981 | Shiozowa et al. | 354/289 |
| 4,281,912 | 8/1981 | Maida | 354/173 |

Primary Examiner—Russell E. Adams
Attorney, Agent, or Firm—Fitzpatrick, Cella, Harper & Scinto

[57] ABSTRACT

A motor driven camera has a power source, a motor connected to the power source and driven by the voltage of the power source, a constant voltage circuit for converting the voltage of the power source into a predetermined constant voltage and putting out the constant voltage, and an electric circuit connected to the constant voltage circuit and driven by the constant voltage circuit. The camera further has a battery checking device which includes a discriminating circuit for receiving the output of the constant voltage circuit and the output of the power source, comparing the two outputs and discriminating whether the voltage of the power source is above a predetermined level, and an indication circuit for receiving the output of the discriminating circuit and indicating the condition of the power source.

6 Claims, 2 Drawing Figures

BATTERY CHECKING DEVICE OF A MOTOR DRIVEN CAMERA

BACKGROUND OF THE INVENTION

1. Field of the Invention

This invention relates to a battery checking device of a motor driven camera.

2. Description of the Prior Art

There has heretofore been a motor drive device which is mountable to a camera body having an electric circuit and which has therein a power source, a motor connected to the power source and driven by the voltage of the power source, and a constant voltage circuit for converting the voltage of the power source into a predetermined constant voltage and putting out the constant voltage. This camera is such that when the motor drive device is mounted to the camera body, power is directly supplied from the power source to the motor and the voltage of the power source is reduced to a predetermined constant voltage by the constant voltage circuit and this output is supplied to the electric circuit in the camera body.

However, the above-described motor driven camera according to the prior art does not have a battery checking device for checking the voltage of the motor driving power source.

SUMMARY OF THE INVENTION

It is an object of the present invention to effectively utilize the output of the aforementioned constant voltage circuit to provide a battery checking device of a motor driven camera.

The invention will become fully apparent from the following detailed description of embodiments thereof taken in conjunction with the accompanying drawings.

DESCRIPTION OF THE PREFERRED EMBODIMENTS

Figure 1:
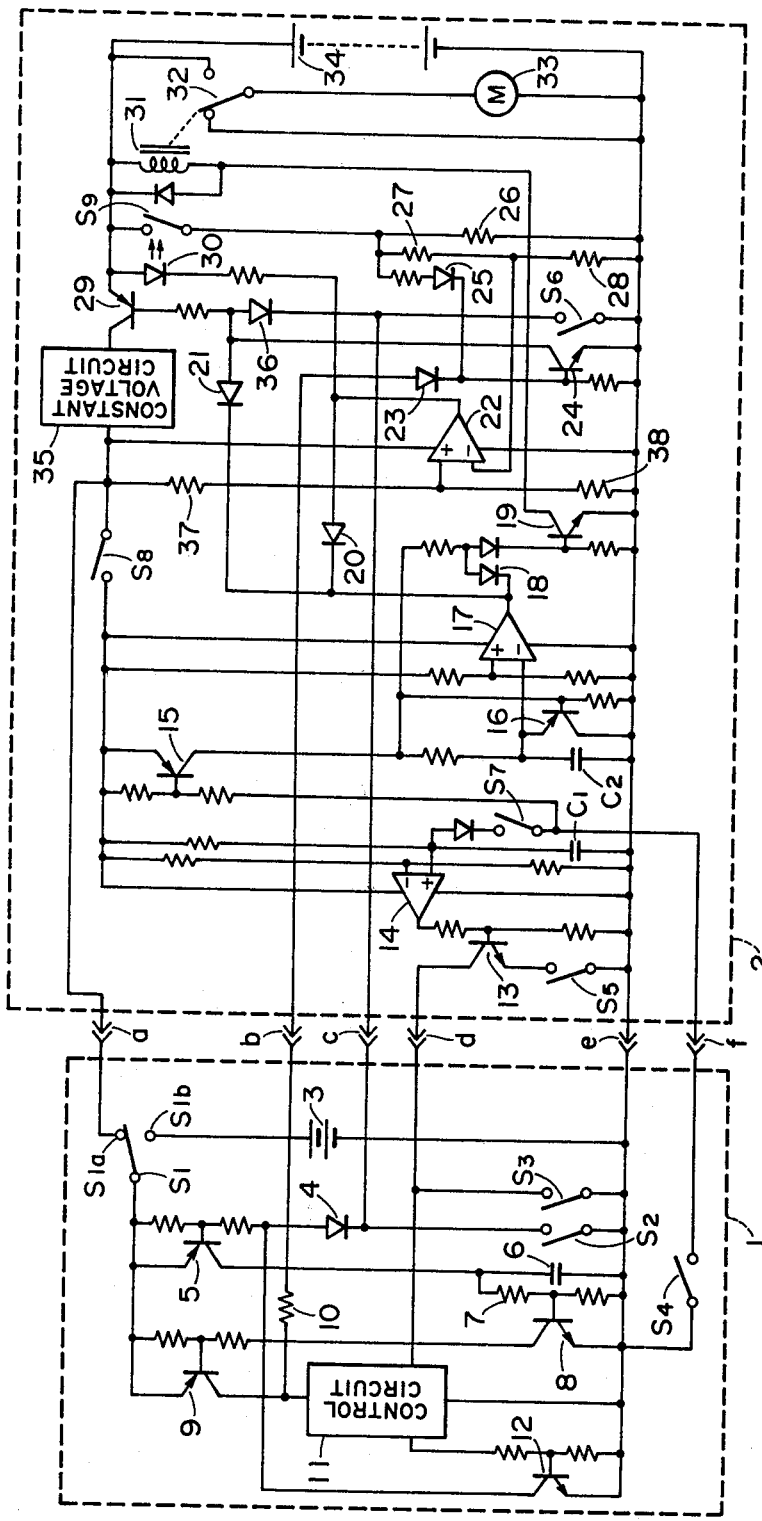
FIG. 1 is an electric circuit diagram showing a first embodiment of the present invention.

Referring to FIG. 1 which shows a first embodiment of the present invention, reference numeral 1 designates a camera body and reference numeral 2 denotes a motor drive device removably mountable to the camera body 1. Electrical connection between the camera body 1 and the motor drive device 2 is made by electrical contacts a-f. Designated by 3 is a power source within the camera body 1. When the motor drive device 2 is mounted to the camera body 1, a power source change-over switch $S_1$ is changed over from $S_{1b}$ to $S_{1a}$ by an automatic change-over mechanism, not shown. The circuit of the camera body 1 is supplied with power from the power source 34 of the motor drive device 2 which will hereinafter be described. A metering switch $S_2$ is closed when the unshown shutter button of the camera body 2 is depressed a step without the motor drive device 2 being mounted to the camera body. Transistors 5, 8 and 9 are designed such that a conduction signal is applied thereto through a reverse current blocking diode 4 upon closing of the switch $S_2$, whereupon these transistors are rendered conductive. A control circuit 11 is supplied with power upon conduction of the transistor 9. The control circuit 11 includes a metering circuit, an exposure control circuit, a sequence control circuit, an indication circuit, a shutter control and aperture control electromagnet, a release electromagnet, etc. Even if the depression of the shutter button is released and the metering switch $S_2$ is opened, the conduction of the transistor 8 is continued for a predetermined time, say, 30 seconds, with the aid of a capacitor 6 and a resistor 7. A transistor 12 is rendered conductive when the camera has entered an operation effecting exposure control such as shutter control, and during the exposure control operation, the transistor 12 ensures power supply to the control circuit 11 independently of the OFF position of the metering switch $S_2$. A release switch $S_3$ is closed with the metering switch $S_2$ when the unshown shutter button of the camera body 1 is further depressed from its one-step depressed position, thereby releasing the shutter of the camera body. A motor driving switch $S_4$ is closed when the exposure of the camera is completed with the shutter closed, and is opened when shutter charge and film advance is completed. During its ON condition, the switch $S_4$ transmits to the motor drive device a motor driving signal for film advance. In the motor drive device 2, a metering switch $S_6$ is closed when the unshown shutter button of the motor drive device is depressed a step. A power supply control transistor 29 has applied thereto a conduction signal through a reverse current blocking diode 36 upon closing of a switch $S_6$ and is thereby rendered conductive to operate a constant voltage circuit 35. The circuit 35 supplies a predetermined constant voltage to the camera body 1 and also supplies a constant voltage to the circuit of the motor drive device. This constant voltage circuit 35 puts out a predetermined voltage lower than the output voltage of a power source 34. By the closure of the metering switch $S_6$ being transmitted to the camera body through a contact c, the power supply transistor 9 for the camera has applied thereto a conduction signal as previously described and is thereby rendered conductive to effect the power supply to the control circuit 11 within the camera body. Even if the metering switch $S_6$ is opened, the transistor 9 is turned on for a predetermined time determined by the aforementioned capacitor 6, resistor 7 and transistor 8. The ON signal of the transistor 9 turns on a transistor 24 through a resistor 10. By the conduction of the transistor 24, the transistor 29 is also rendered conductive to continue the power supply to the constant voltage circuit 35 and the control circuit 11.

When a wind-up mode switch $S_8$ is in its ON position, the automatic film wind-up mode by the motor is brought about and, when the switch $S_8$ is in its OFF position, there is brought about the manual film wind-up mode in which the motor is not rotated but film wind-up is effected by means of an unshown wind-up lever on the camera body. At this time, shutter release is effected only by means of the shutter button of the camera body. This manual operation mode is used during loading of a film, or when it is not desired to have any drive sound produced by motor wind-up, or when the voltage of the battery is insufficient to drive the motor but sufficient to drive the camera.

The operation when the switch $S_8$ is in its ON position is effected in the following manner.

When the unshown shutter button of the motor drive device is further depressed from its one-step depressed position, the release switch $S_5$ is closed with the metering switch $S_6$ and if, at that time, the potential of the capacitor $C_1$ of a release timing circuit comprising a capacitor $C_1$, a resistor, a comparator 14 and a transistor 13 is higher than the comparison reference voltage of the comparator 14, transistor 13 is rendered conductive and a release signal is put out to the camera body 1, whereupon exposure of the film within the camera is started. When the exposure is completed, the motor driving switch $S_4$ is closed. If, at that time, a photography mode switch $S_7$ is in its OFF position, the capacitor $C_1$ is not discharged by the switch $S_4$ and therefore, the capacitor $C_1$ is not reset and accordingly, the ON state of transistor 13 does not change even if the release switch $S_5$ remains closed. Consequently, even when wind-up is completed, re-release does not take place. For rephotography, the hand is released from the shutter button and the release switch $S_5$ is once opened, whereafter the release switch $S_5$ is again closed and the shutter is released. That is, this mode is a one-frame photography mode. When the photography mode switch $S_7$ is in its ON position, if the motor driving switch $S_4$ is closed, the capacitor $C_1$ is discharged through the reverse current blocking diode and the comparator 14 is inverted. Transistor 13 once changes from its ON state to its OFF state even if the release switch $S_5$ is in its ON position. When wind-up is completed and the switch $S_4$ is opened, the comparator is inverted at a predetermined timing after that point of time and if, at that time, the release switch $S_5$ is in its ON position, the transistor 13 is again rendered conductive and re-release takes place. That is, this mode is a continuous photography mode.

As soon as the motor driving switch $S_4$ is closed, transistor 15 is also turned on. Accordingly, transistor 19 is also turned on and power is supplied to a relay coil 31. Thereby, a relay switch 32 is changed over to rotate a motor 33, whereby the film within the camera body is wound up through a wind-up mechanism, not shown.

Simultaneously with the conduction of the transistor 15, integration of an end timer comprising a resistor, a capacitor $C_2$ and a comparator 17 is started, but during the usual wind-up time, the integration potential of the capacitor $C_2$ does not reach the inversion potential of the comparator 17. Accordingly, the output of the comparator 17 remains high and does not affect the operation of transistor 19. Transistor 16 is for rapidly discharging the capacitor $C_2$ and resetting the same when the transistor 15 has been turned off by completion of wind-up.

To prevent the motor from being burnt when the power supply time of the motor has become longer than a predetermined time, namely, when the film at its end has become incapable of being drawn out from the film magazine, or when the voltage of the battery has dropped and the wind-up time has become longer, or when film wind-up has become impossible for some reason, the comparator 17 is inverted. Then, the output thereof become low and transistor 19 is turned off through a reverse current blocking diode 18 and the motor 33 is stopped. Also, when the output of the comparator 17 becomes low, LED 30 is turned on through a reverse current blocking diode 20, indicating the stoppage of the motor. The low output of the comparator 17 renders a power supply transistor 29 conductive through a reverse current blocking diode 21, so that a timer composed of the capacitor 6 and the resistor 7 on the camera body side becomes OFF and this signal is transmitted through resistor 10 to transistor 24 and, even if this transistor is turned off, the power supply to the comparator 17 is continued through the constant voltage circuit 35 and thus, the motor stoppage indication by LED 30 is maintained. This indication is used as the warning when the motor power supply time has become longer than a predetermined time. When a battery check switch $S_9$ is closed, a dummy current having a value substantially equal to that of the current flowing to the motor 33 flows to a dummy resistor 26 and at the same time, transistor 24 is turned on through a reverse current blocking diode 25. Consequently, a conduction signal is applied to a power supply transistor 29, which is thus turned on, and the constant voltage circuit 35 is operated. The output voltage of this circuit 35 is divided by resistors 37 and 38 and the divisional voltage is applied as a comparison reference voltage to a battery check comparator 22. The output of the circuit 35 also acts to operate the comparator 22. The voltage of a battery 34 is divided by resistors 27 and 28 and applied to the other input of the comparator and, when that voltage is higher than the comparison reference voltage, namely, when the voltage of the battery 34 is higher than a predetermined voltage, the output of the comparator 22 becomes low and a current flows to LED 30, which thus indicates that the voltage is sufficient. When the voltage of the battery is below the predetermined voltage, the output of the comparator 22 becomes high and LED 30 is turned off. Whenever a battery check switch $S_9$ is OFF, the output of the comparator 22 is high and therefore, the turn-on of LED 30 by the comparator 22 does not occur. Even if the battery check switch $S_9$ is closed and transistor 24 is turned on and the power supply transistor 29 becomes conductive, the conduction signal is prevented by a reverse current blocking diode 36 from being transmitted to the camera body side and therefore, the power supply circuit 5, 8, 9 on the camera body side is not closed by the closing of the battery check switch $S_9$. That is, when the metering switch $S_6$ is closed, the power supply circuit 5, 8, 9 on the camera body side is closed, but when the battery check switch $S_9$ is closed, the power supply circuit 5, 8, 9 on the camera body side is not closed. The comparator 22 and resistors 27, 28, 37, 38 together constitute a discriminating circuit for discriminating whether the output voltage of the power source 34 is above a predetermined level.

Figure 2:
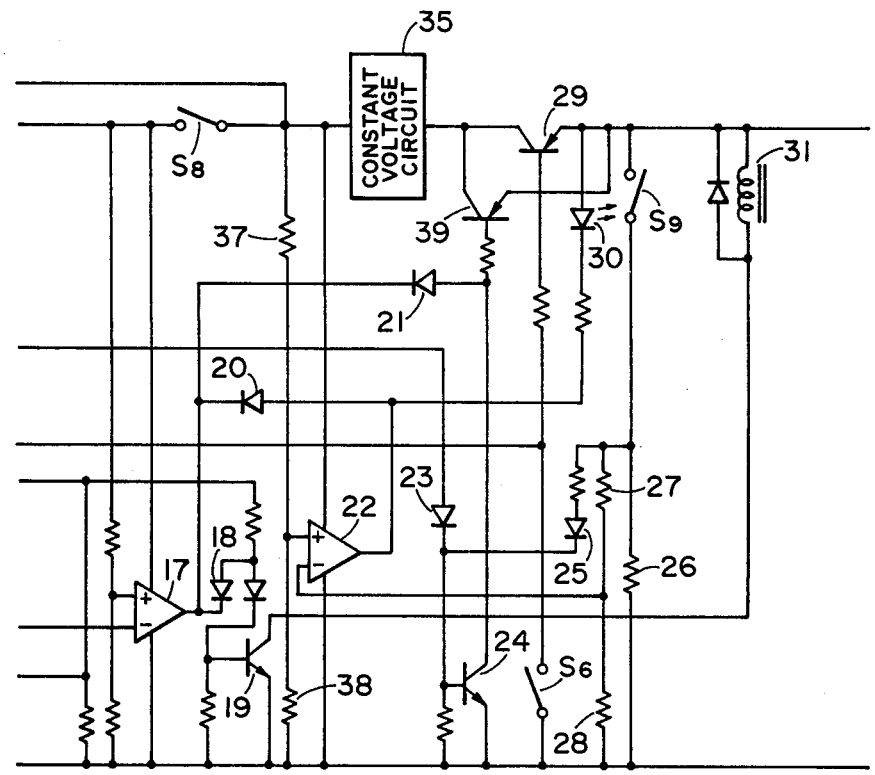
FIG. 2 is an electric circuit diagram showing a second embodiment of the present invention.

FIG. 2 shows a second embodiment of the present invention, and particularly shows portions of the second embodiment which differ from the first embodiment. The second embodiment does not employ the reverse current blocking diode 36 shown in the first embodiment. In the second embodiment, a second power supply transistor 39 is parallel-connected to the power supply transistor 29. The first power supply transistor 29 is controlled only by metering switches $S_6$ and $S_2$, and the second power supply transistor 39 is controlled only by transistor 24 and comparator 17. In the other points, the construction of the present embodiment is the same as that of the first embodiment and therefore need not be described further.

The motor driven camera hitherto described comprises a camera body and a motor drive device mountable to the camera body. However, the motor driven camera of the present invention includes the type which contains a motor drive device in the camera body.

As has been hitherto described, according to the present invention, in a motor driven camera wherein a power source for driving a motor is connected to another electric circuit through a constant voltage circuit, the output of the constant voltage circuit is used as the reference voltage for checking the voltage of the power source, and this leads to a simplified construction of the battery checking device.

I claim:

1. A motor driven camera having a power source, a motor connected to said power source and driven by the voltage of said power source, a constant voltage circuit for converting the voltage of said power source into a predetermined constant voltage and putting out the constant voltage, and an electric circuit connected to said constant voltage circuit and driven by said constant voltage circuit, said camera further having a battery checking device including a discriminating circuit for receiving the output of said constant voltage circuit and the output of said power source, comparing said two outputs and discriminating whether the voltage of said power source is above a predetermined level, and an indication circuit for receiving the output of said discriminating circuit and indicating the condition of said power source.

2. A motor driven camera according to claim 1, further having a first power supply circuit between said power source and said constant voltage circuit, and wherein said first power supply circuit transmits the power from said power source to said constant voltage circuit when a conduction signal is applied to said first power supply circuit, said electric circuit driven by said constant voltage circuit having a control circuit for controlling exposure and a second power supply circuit connected between said control circuit and said constant voltage circuit, said second power supply circuit transmits the power from said constant voltage circuit to said control circuit when a conduction signal is applied to said second power supply circuit, and said motor driven camera further has a first signal circuit for producing a conduction signal in response to shutter release operation and applying said conduction signal to said first and second power supply circuits.

3. A motor driven camera according to claim 2, wherein said battery checking device has a second signal circuit for producing a conduction signal in response to battery checking operation, applying said conduction signal to said first power supply circuit and allowing power transmission from said power source to said constant voltage circuit, and blocking means for preventing said conduction signal produced in response to battery checking operation from being applied to said second power supply circuit.

4. A motor driven camera according to claim 3, which comprises a camera body and a motor drive device removably mountable to said camera body and wherein said control circuit and said second power supply circuit are disposed in said camera body, and said power source, said motor, said constant voltage circuit, said discriminating circuit, said indication circuit, said first power supply circuit and said second signal circuit are disposed in said motor drive device, and said camera body has another power source for supplying power to said control circuit through said second power supply circuit when said motor drive device is not mounted to said camera body, and a circuit for producing a conduction signal in response to the operation of a shutter button provided on said camera body, applying said condution signal to said second power supply circuit and allowing the power transmission from said another power source to said control circuit.

5. A motor driven camera according to claim 1, wherein said indication circuit has an indicator adapted to operate when the voltage of said power source is above a predetermined level, and said motor driven camera has a circuit for detecting whether wind-up operation has been completed within a predetermined time and operating said indicator when the wind-up operation is not completed within said predetermined time.

6. A motor drive device removably mountable to a camera body having an electric circuit, said motor drive device having a power source, a motor connected to said power source and driven by the voltage of said power source, and a constant voltage circuit for converting the voltage of said power source into a predetermined constant voltage and putting out said constant voltage and transmitting said output voltage to said electric circuit, said motor drive device including a discriminating circuit for receiving the output of said constant voltage circuit and the output of said power source, comparing said two outputs and discriminating whether the voltage of said power source is above a predetermined level, and an indication circuit for receiving the output of said discriminating circuit and indicating the condition of said power source.

* * * * *